United States Patent [19]
Finneman

[11] 3,891,261
[45] June 24, 1975

[54] CATWALK FOR VEHICLE BOXES

[76] Inventor: Erwin F. Finneman, Anamoose, N. Dak. 58710

[22] Filed: Jan. 4, 1974

[21] Appl. No.: 430,648

[52] U.S. Cl.................. 296/1 R; 105/447; 105/457; 280/166
[51] Int. Cl............................................. B62d 39/00
[58] Field of Search......... 296/1 R, 28 M, 58, 57 A, 296/59; 280/163, 164, 165, 166; 105/457, 458, 447, 341, 437; 182/89

[56] References Cited
UNITED STATES PATENTS

| | | | |
|---|---|---|---|
| 752,031 | 2/1904 | Chadwick | 280/166 |
| 868,352 | 10/1907 | Marr | 182/89 |
| 2,018,064 | 10/1935 | Hofacker | 280/166 |
| 2,783,555 | 4/1957 | Wright | 105/447 |
| 3,517,942 | 6/1970 | Cuffe et al. | 280/166 |

Primary Examiner—Robert J. Spar
Assistant Examiner—Donald W. Underwood
Attorney, Agent, or Firm—Merchant, Gould, Smith & Edell

[57] ABSTRACT

An elongated catwalk element having longitudinally spaced hinges for mounting the catwalk element on the side of a vehicle mounted box. The hinges mount the catwalk element for swinging movements between a vertically disposed inoperative storage position along a side wall of the box and a horizontally disposed operative position wherein the catwalk projects laterally outwardly from the box. An over-center spring biases the catwalk element in directions to yieldingly hold the catwalk selectively in its operative and inoperative positions.

2 Claims, 4 Drawing Figures

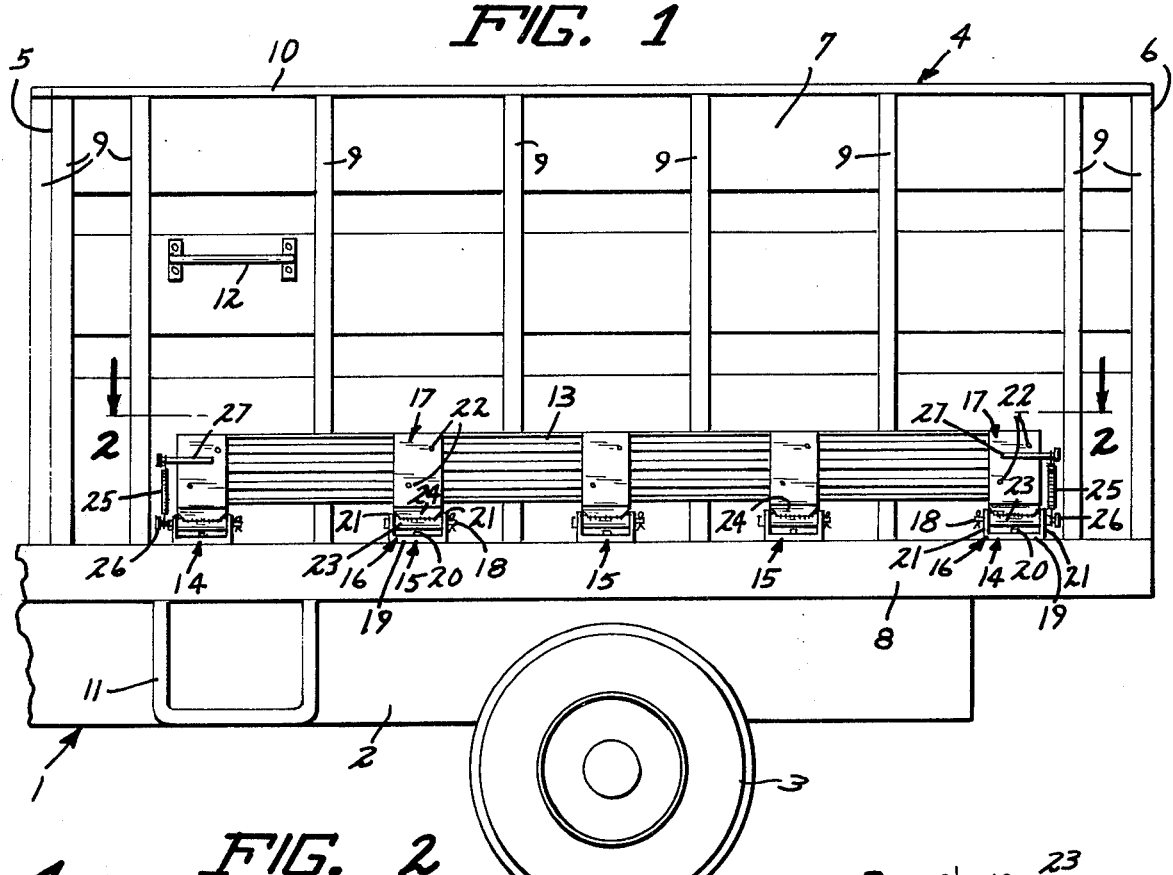
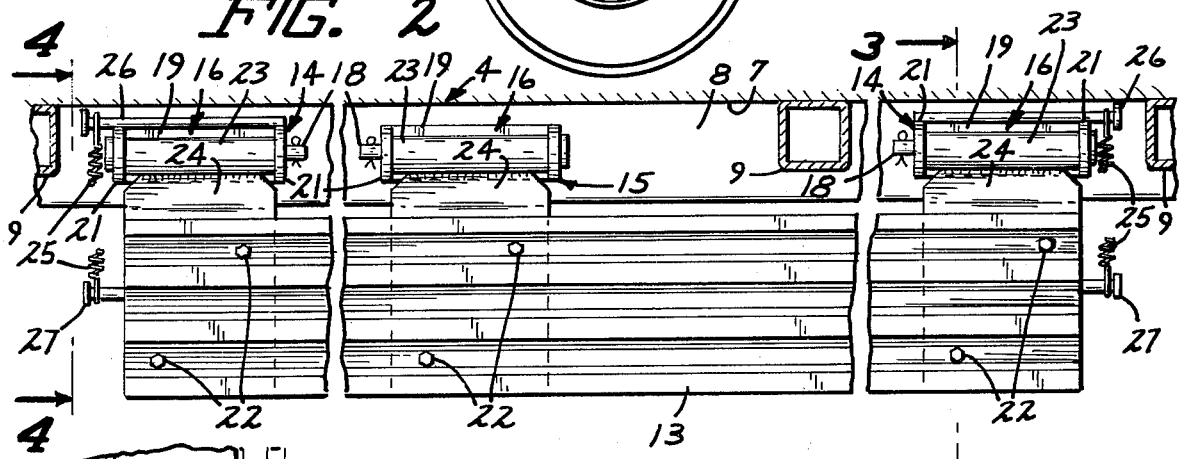
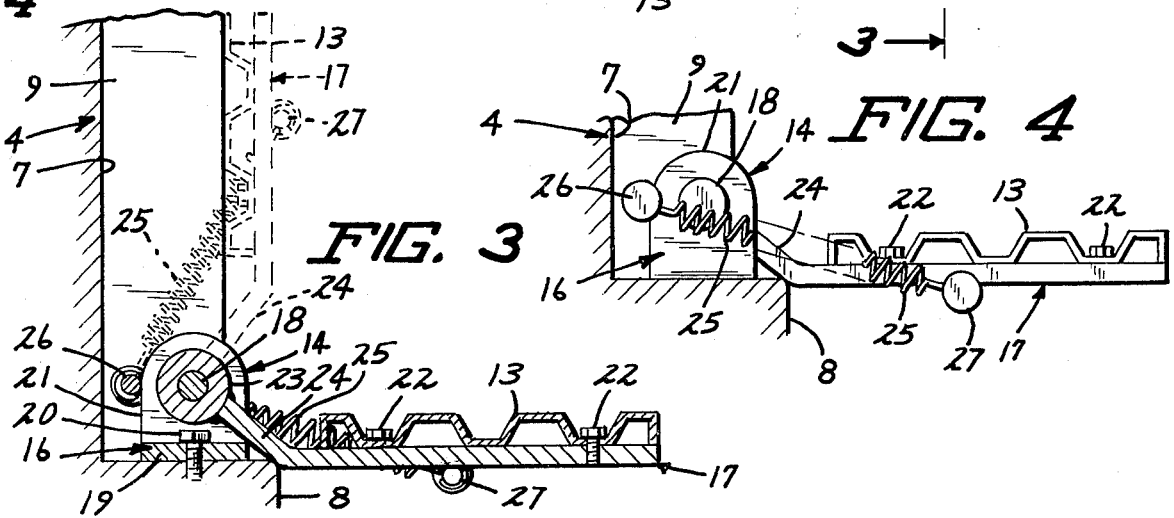

CATWALK FOR VEHICLE BOXES

BACKGROUND OF THE INVENTION

Open-topped wagon or truck boxes are generally provided with longitudinal exterior frame rails adjacent the bottoms of the boxes, generally for reinforcement or as supporting means for the boxes. These rails sometimes afford a foothold for a workman who wishes to observe or aid in the loading or unloading of the contents, to apply or remove a tarpaulin or other cover to the box, and for other purposes. At best, the foothold provided by such rails is precarious, requiring the workman to hold onto the box with one hand, while using the other hand to perform whatever work is required. Due to the width limitations imposed on highway vehicles, these rails are quite narrow so as to afford a maximum width of box.

SUMMARY OF THE INVENTION

An important object of this invention is the provision of a catwalk which is easily mounted on a vehicle box and which may be quickly and easily moved between a horizontally disposed operative position, wherein an operator may have a firm platform of adequate width to stand on, and an inoperative storage position against the side of the vehicle box, wherein it adds very little, if any, width to the vehicle.

Another object of this invention is the provision of means for automatically releasably holding the catwalk in either of its operative or storage positions.

To these ends, I provide an elongated catwalk element or platform that is adapted to extend along a vehicle box adjacent the bottom of the box; and a plurality of hinges disposed in spaced apart relationship longitudinally of the box. Each hinge involves a hinge bracket for mounting on the vehicle and a hinge plate that is rigidly connected to one surface of the catwalk element. The hinge bracket and plate of each hinge are pivotally connected by a different one of a plurality of aligned pintles extending parallel to the catwalk element. Each hinge plate has a portion which engages a portion of the vehicle box or frame to limit swinging movement of the catwalk downwardly beyond its horizontal operative position. At least one of the hinges is provided with a spring which is connected to the hinge bracket and hinge plate in a manner to be moved in over center relationship with respect to the axis of the hinge pintle, whereby to automatically yieldingly hold the catwalk in both of the operative and inoperative positions of the catwalk when mounted on the vehicle.

BRIEF DESCRIPTION OF THE DRAWINGS

FIG. 1 is a fragmentary view in side elevation of a vehicle showing the catwalk of this invention mounted thereon and disposed in an inoperative storage position;

FIG. 2 is an enlarged fragmentary section taken substantially on the line 2—2 of FIG. 1 and showing the catwalk disposed in its operative position;

FIG. 3 is a further enlarged fragmentary section taken substantially on the line 3—3 of FIG. 2; and FIG. 4 is an enlarged fragmentary section taken on the line 4—4 of FIG. 2.

DETAILED DESCRIPTION OF THE PREFERRED EMBODIMENT

In FIG. 1, the rear end portion of a vehicle, such as a commercial truck, indicated generally at 1, is shown as including a frame or chassis 2 supported by pneumatic tire-equipped rear wheels 3, one of which is shown. An open-topped load carrying box 4 may be assumed to be generally rectangular in form, comprising front and rear walls 5 and 6 respectively and side walls 7, one of which is shown. The box 4 further includes a bottom frame portion or rail 8, and vertical and horizontal reinforcing member 9 and 10 respectively. Although not shown, it may be assumed that the front and rear walls 5 and 6, as well as the opposite side wall 7, are provided with reinforcing members 9 and 10. As is customary, the rails 8 project outwardly slightly from the side walls 7, as shown in FIGS. 2–4. The vehicle 1 further includes a step 11 and a handle 12 to enable a workman to climb upwardly onto the adjacent rail 8.

The catwalk of this invention includes an elongated cat-walk element or platform 13 which may be made from any suitable material but which is preferably, and as shown, formed from relatively heavy sheet metal into longitudinally extending corrugations which provide rigidity and strength to the platform 13.

Means for mounting the platform 13 on the box 4 comprises a pair of end hinges 14 and a plurality of intermediate hinges 15 each comprising a hinge bracket 16, a hinge plate 17, and a pintle element 18. The hinge brackets 16 are of generally U-shape, each including a base portion 19 that is secured to the rail 8 by means of a bolt or the like 20, and a pair of upstanding ears 21 having aligned openings therethrough for reception of their respective pintle element 18. Each hinge plate 17 underlies the platform 13 and is rigidly secured thereto by machine screws or like fasteners 22, the inner ends of the hinge plates 17 having tubular portions 23 which are received on respective ones of the pintle elements 18 intermediate the ears 21 of their respective hinge brackets 16. Each of the hinge plates 17 are connected to their respective tubular portions 23 by connecting portions 24 that are angularly displaced from the plane of their respective hinge plates 17, see particularly FIGS. 3 and 4. The angular connecting portions 24 engage the side rail 8 to limit swinging movement of each hinge plate 17 in a downward direction, to hold the catwalk element or platform 13 in a horizontal operative position, as shown by full lines in FIGS. 3 and 4.

Each of the end hinges 14 is provided with means for yieldingly holding the catwalk element 13 in its horizontal operative position as well as in an inoperative generally vertically disposed storage position against the vertical reinforcing members 9, as shown in FIGS. 1 and 3. Such means comprises a pair of coil tension springs 25 each associated with a different one of the end hinges 14. Each spring 25 is connected at one end to an anchoring element in the nature of a headed pin 26 welded or otherwise rigidly secured to a respective one of the hinge brackets 16, and at its other end to an anchoring element in the nature of a second headed pin 27 anchored to a respective one of the hinge plates 17, by welding or the like. The anchoring pins 26 and 27 are so disposed on their respective end hinges 14 that the springs 25 partake of an over center movement relative to the axis of their respective pintles 18 when the catwalk element or platform 13 is moved from one of its operative or inoperative positions to the other thereof. Thus, when the platform or catwalk element 13 is moved to its horizontally disposed operative position, the springs 25 aid the force of gravity in yieldingly holding the platform 13 in its operative position. Then, when the platform 13 is manually swung upwardly toward its inoperative storage position in engagement with the adjacent box members 9, as shown by dotted lines in FIG. 3, the springs 25 yeildingly hold the hinge plates 17 and platform 13 in their inoperative storage position. The step 11 and handle 12 aid the user in climbing on to the platform 13 when the same is swung downwardly to its operative position.

The platform or catwalk element 13 is of sufficient width to give a rather broad base of support for the feet of a workman, but is of sufficiently small thickness to provide a minimum of laterally outward projection from the outer limits of the vehicle when the platform 13 is in its folded storage position. While I have shown the catwalk of this invention as being applied to one side of a vehicle box, it will be appreciated that other similar catwalks may be mounted on the rear, as well as the opposite side of the box 4. Thus, the workman is able to move about the box 4 for the purpose of spreading a cover, such as a tarpaulin, over the open top of the box, or removing the same therefrom, or to perform any other duties which may be necessary. Also, with this arrangement, the workman is enabled to use both hands in the performance of his tasks without the necessity for using one hand to support himself on the vehicle while working.

While I have shown and described a commercial embodiment of catwalk structure, it will be understood that the same is capable of modification without departure from the spirit and scope of the invention, as defined in the claims.

What is claimed is:

1. A catwalk for vehicle mounted load carrying boxes having laterally spaced side walls, comprising:
   a. an elongated catwalk element disposed adjacent one side wall of a vehicle box structure;
   b. a plurality of longitudinally spaced hinges for mounting said catwalk element on the box structure for movements about a common generally horizontal axis extending parallel to the sidewall of the vehicle box structure between a generally vertically disposed inoperative storage position generally parallel to and engaging the sidewall and a generally horizontal load carrying position wherein the catwalk element projects laterally outwardly from the sidewall, said hinges each including:
      1. a hinge bracket structure having a base portion adapted to be secured to a portion of the box structure and a pintle supporting portion projecting laterally from the base portion, said pintle supporting portion having an opening therethrough;
      2. pintle means extending through said opening;
      3. and a hinge plate having one end mounted on said pintle means for swinging movements relative to said hinge bracket structure, a plate-like portion for connection to said catwalk element, and a connecting portion between said plate-like portion and said one end, said connecting portion being disposed at an angle to the plane of said plate-like portion and disposed to engage a portion of one of said structures when mounted on the vehicle, to limit swinging movement of said catwalk element in a downward direction beyond said operative position thereof;
   c. one of said hinges including a pair of anchoring elements one on its respective hinge bracket structure and the other on its respective hinge plate;
   d. and a coil spring having opposite ends each connected to a different one of said anchoring elements;
   e. said anchoring elements being so disposed on said hinge bracket structure and hinge plate relative to the axes of said pintle means that said anchoring element on the hinge plate moves through an over center relationship with said pintle means axis and the other of said anchoring elements during movement of said hinge plate and catwalk element between operative and inoperative positions thereof, whereby said spring yieldingly holds said hinge plate and catwalk element in said operative and inoperative positions.

2. The catwalk defined in claim 1 in which said anchoring elements comprise pins projecting laterally from said bracket and hinge plate, said spring being a tension spring having opposite ends connected to said pins.

* * * * *